Nov. 11, 1930. C. J. BURKLEY ET AL 1,781,651
TEMPLATE FOR ASSEMBLING STRIPS OF TIRE CHAIN MATERIAL
Filed April 22, 1927 2 Sheets-Sheet 1

INVENTOR
Clement J. Burkley.
Elmer G. Kimmich.
BY
ATTORNEY

Nov. 11, 1930.  C. J. BURKLEY ET AL  1,781,651
TEMPLATE FOR ASSEMBLING STRIPS OF TIRE CHAIN MATERIAL
Filed April 22, 1927  2 Sheets-Sheet 2

INVENTOR
Clement J. Burkley.
Elmer G. Kimmich.
BY
ATTORNEY

Patented Nov. 11, 1930

1,781,651

UNITED STATES PATENT OFFICE

CLEMENT J. BURKLEY AND ELMER G. KIMMICH, OF AKRON, OHIO, ASSIGNORS TO THE GOODYEAR TIRE & RUBBER COMPANY, OF AKRON, OHIO, A CORPORATION OF OHIO

TEMPLATE FOR ASSEMBLING STRIPS OF TIRE-CHAIN MATERIAL

Application filed April 22, 1927. Serial No. 185,795.

Our invention relates to anti-slipping devices for vehicle wheels and it has for its object the provision of a novel method of and apparatus for manufacturing elements of that class of devices commonly known as tire chains.

Devices of the above designated character comprise a pair of chains adapted to be disposed circumferentially adjacent each side of a wheel tire, and are connected by a plurality of tractive cross-members extending transversely of the tread of the tire.

Cross-members composed of resilient compound, such as rubber, have been proposed and are now being used in the construction of tire chains. This type of resilient member is much less injurious to a tire casing than the well-known all-metal anti-skid tire chains, and the rubber elements wear longer than those made of metal while providing equal or superior tractive characteristics.

Our invention is primarily directed to a practical method of making resilient cross-members for tire chains wherein a number of elements are assembled upon a building form or template and are subsequently vulcanized in a mold.

A preferred embodiment of our invention will be described in the following specification and is illustrated in the accompanying drawings wherein.

Figure 1:
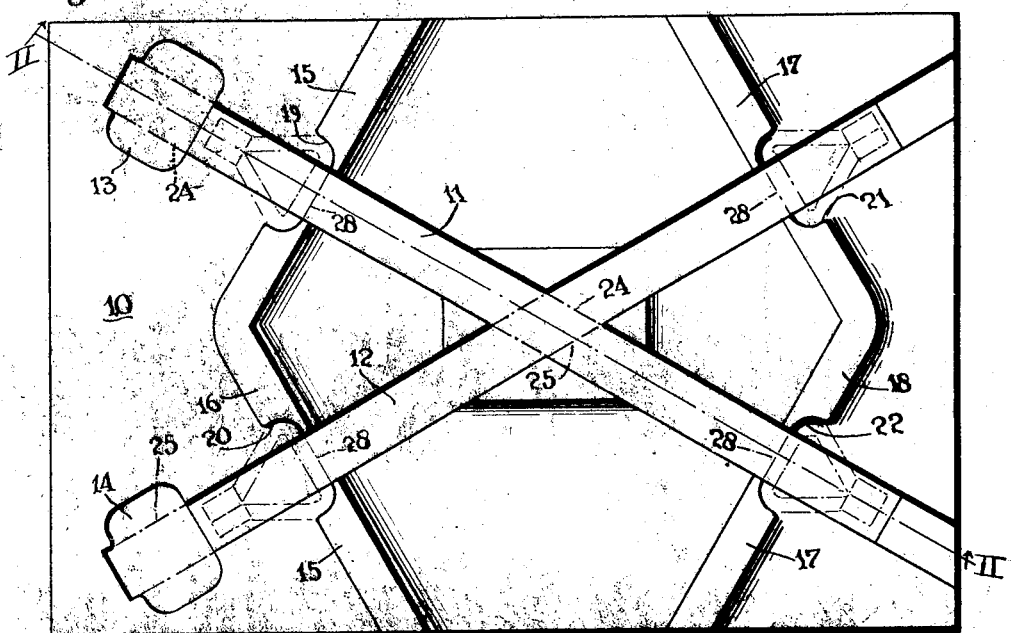
Fig. 1 is a plan view of a form provided for use in assembling the various parts comprising our improved tractive element.
Figure 2:
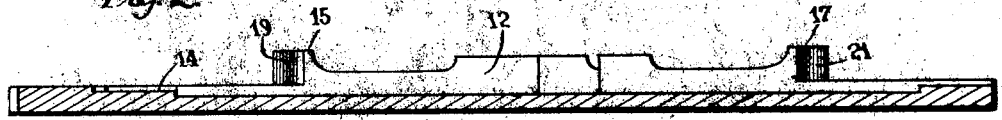
Fig. 2 is a cross-sectional view, taken substantially along the line II—II of Fig. 1.

In practicing our invention we provide a building form or template 10 which is preferably formed of metal and is provided with intersecting depressions or grooves 11 and 12, arranged in the form of an elongate letter X. The corresponding ends of the depressions 11 and 12 terminate in enlarged relatively shallow depressions 13 and 14 respectively. The template 10 is also provided with upstanding flanges 15, 16, 17, and 18, which intersect and are disposed at right angles to the depressions 11 and 12 adjacent their extremities. The flanges 15, 16, 17 and 18 are partially cut away at their points of intersection with the depressed portions 11 and 12 to form curved recesses 19, 20, 21 and 22.

Figure 3:
Fig. 3 is a fragmentary cross-sectional view of a tractive element showing the initial step in the assembly of the components thereof.
Figure 4:
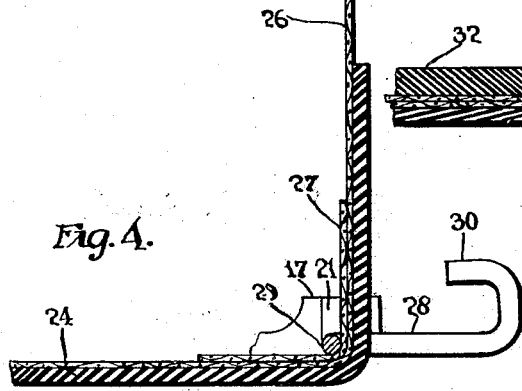
Fig. 4 is a fragmentary cross-sectional view showing the next succeeding step.
Figure 5:
Fig. 5 is a fragmentary cross-sectional view illustrating the manner of applying fastening means to a tractive element.

In building our improved tractive element, rectangular strips of uncured rubber 24 and 25 are cut to the desired lengths and are successively placed in each of the depressions 11 and 12 of the template 10. A strip of rubberized cord fabric 26 is superposed upon the rubber strip 24 before the strip 25 is positioned within the template 10, and an identical strip 26 is superposed upon the strip 25 after the latter has been placed in the template. As best shown by Figs. 3 and 4, an additional relatively short reinforcing strip of rubberized cord fabric 27 is applied to the fabric 26 at each point of intersection of the flanges 15, 16, 17 and 18, with the depressions 11 and 12. The corresponding ends of the strips 24 and 25 abut the outer borders of the recesses 13 and 14 which are enlarged in order to facilitate handling of the strips by a workman. An open chain link 28 comprising a triangular loop 29 and a hook 30 of U-shape is then disposed in each of the recesses 19, 20, 21 and 22, the ends of the superposed rubber and fabric strips 24 and 26 having first been threaded through the triangular loops 29 of links 28, as indicated in Fig. 4. The extremities of the strips 24 and 26 are now folded inwardly against themselves as shown in Fig. 5 and are securely held in position by the adhesive properties of the rubberized fabric 27. The ends of each strip 24 and 25 are treated in the same manner.

Figure 6:
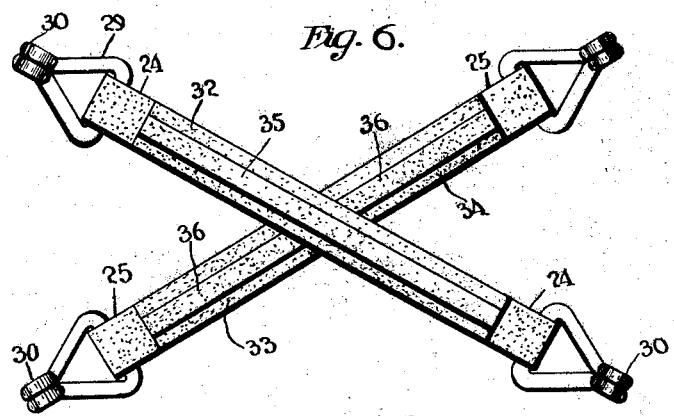
Fig. 6 is a plan view of one unit of assembled tractive elements before they are molded.

The next step in the method consists in superposing an outer strip of uncured rubber 32 upon the strip 24 and relatively shorter strips 33 and 34 upon the member 25 and abutting the strip 32 at its middle portion. The strips 32, 33 and 34 are provided on their upper surfaces with thickened central ribs 35 and 36, as shown in Fig. 6, the purpose of which will presently become apparent.

Figure 7:
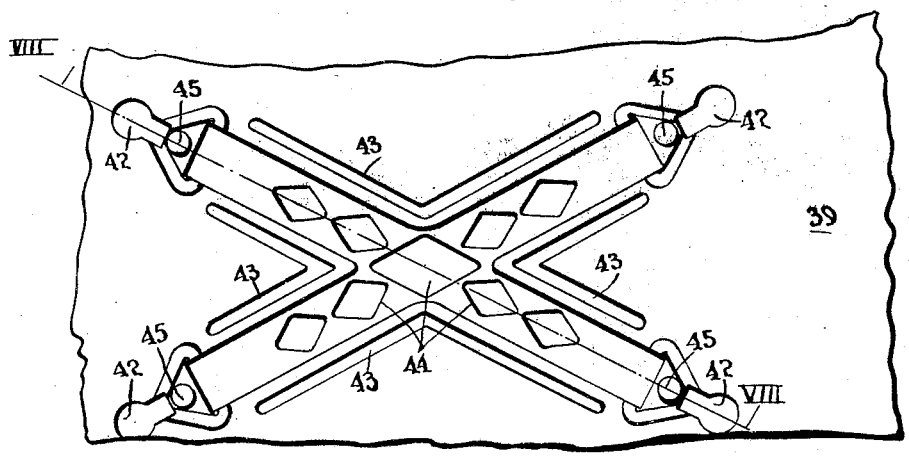
Fig. 7 is a fragmentary plan view of one section of a molding apparatus employed in practicing our invention.
Figure 8:
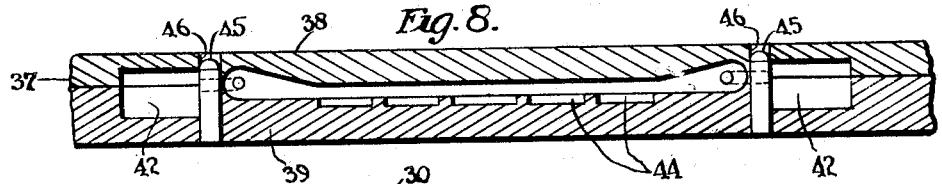
Fig. 8 is a cross-sectional view taken substantially along the line VIII—VIII of Fig. 7, the complemental portion of the mold not shown by Fig. 7 being added.

After the elements are thus assembled they are placed in a vulcanizing mold 37, shown in Figs. 7 and 8, which comprises upper and lower complemental sections 38 and 39. These sections 38 and 39 in assembled relation provide a cavity 40 of cruciform configuration adapted to receive the article preformed upon the template 10, and they also provide cavities 42 adapted to receive the hooks 30 during the vulcanization process. Grooves 43 formed in section 39 and disposed adjacent the main cavity 40, are adapted to receive overflow or excess rubber which may be pressed out during the molding operation, the thickened upper ribs of rubber 35 and 36 providing ample stock to fill tread depressions 44 and to completely encase the cord fabric. The sections of the mold are held in proper alignment by means of dowel pins 45 which extend upwardly from the lower section 39 and are adapted to be disposed within openings 46 in the upper section.

Figure 9:
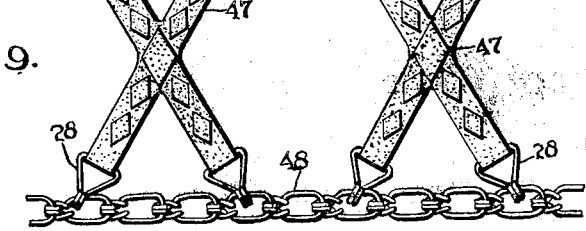
Fig. 9 is a fragmentary plan view of a completed device constructed according to our invention.

By vulcanization of the assembled elements, a compact cross-link 47, shown in Fig. 9, is produced. After the rough edges have been trimmed it is then ready for assembly with side chains 48 in the relation shown by Fig. 9; that is, the links 28 are secured at proper intervals to links of the chains 48, by closing the hooks 30 thereabout. The chain thus assembled is adapted to be applied to automobile wheels to perform its function of preventing skidding and affording additional traction.

Although we have illustrated but a single form which our invention may assume and have described in detail but one application thereof, it will be apparent to those skilled in the art that the invention is not so limited but that various modifications and changes may be made therein without departing from the spirit of the invention or from the scope of the appended claims.

What we claim is:

1. A template for assembling strips of tire chain material having anchoring means at the ends comprising a central portion having grooves extending transversely thereof, and raised portions extending transversely toward the grooves and having abutments adjacent thereto, the abutments being adapted to aid in the proper positioning of the anchoring means.

2. A template for assembling strips of tire chain material having anchoring means at the ends comprising a central portion having intersecting grooves therein, and abutments bordering the grooves at equal distances from the point of intersection thereof, the abutments being adapted to aid in the proper positioning of the anchoring means.

3. A template for assembling strips of tire chain material having anchoring means at its ends, comprising a central portion having an elongate groove therein, and abutments extending transversely of the groove adjacent the ends of the latter, the abutments being adapted to aid in the proper positioning of the anchoring means.

In witness whereof, we have hereunto signed our names.

Signed at Akron, in the county of Summit, and State of Ohio, this 21st day of April, 1927.

CLEMENT J. BURKLEY.
ELMER G. KIMMICH.